Oct. 14, 1947.    I. C. GARDNER    2,428,797
WIDE ANGLE BINOCULAR TELESCOPE AND RANGE FINDER
Filed July 13, 1944    2 Sheets-Sheet 1
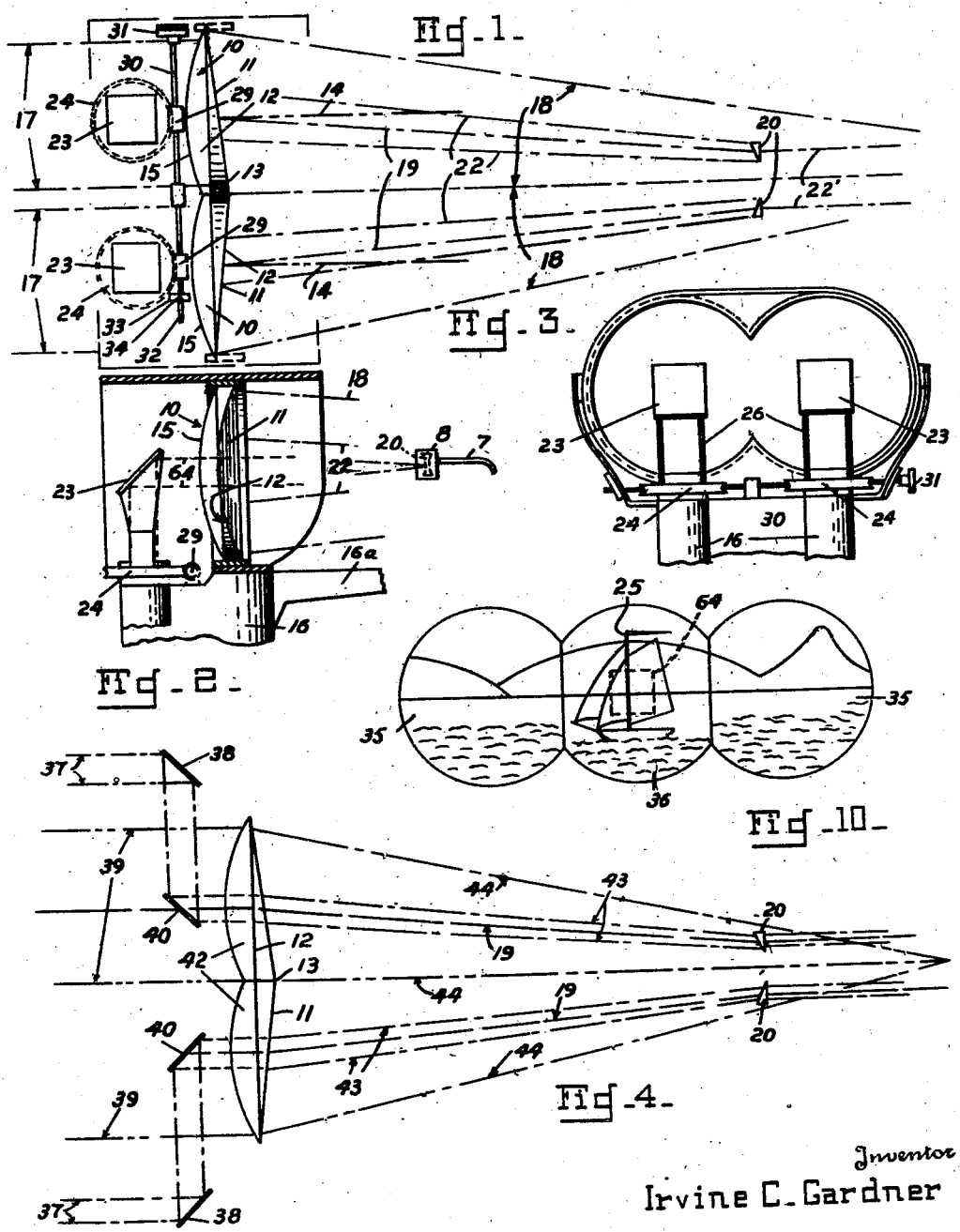
Inventor
Irvine C. Gardner

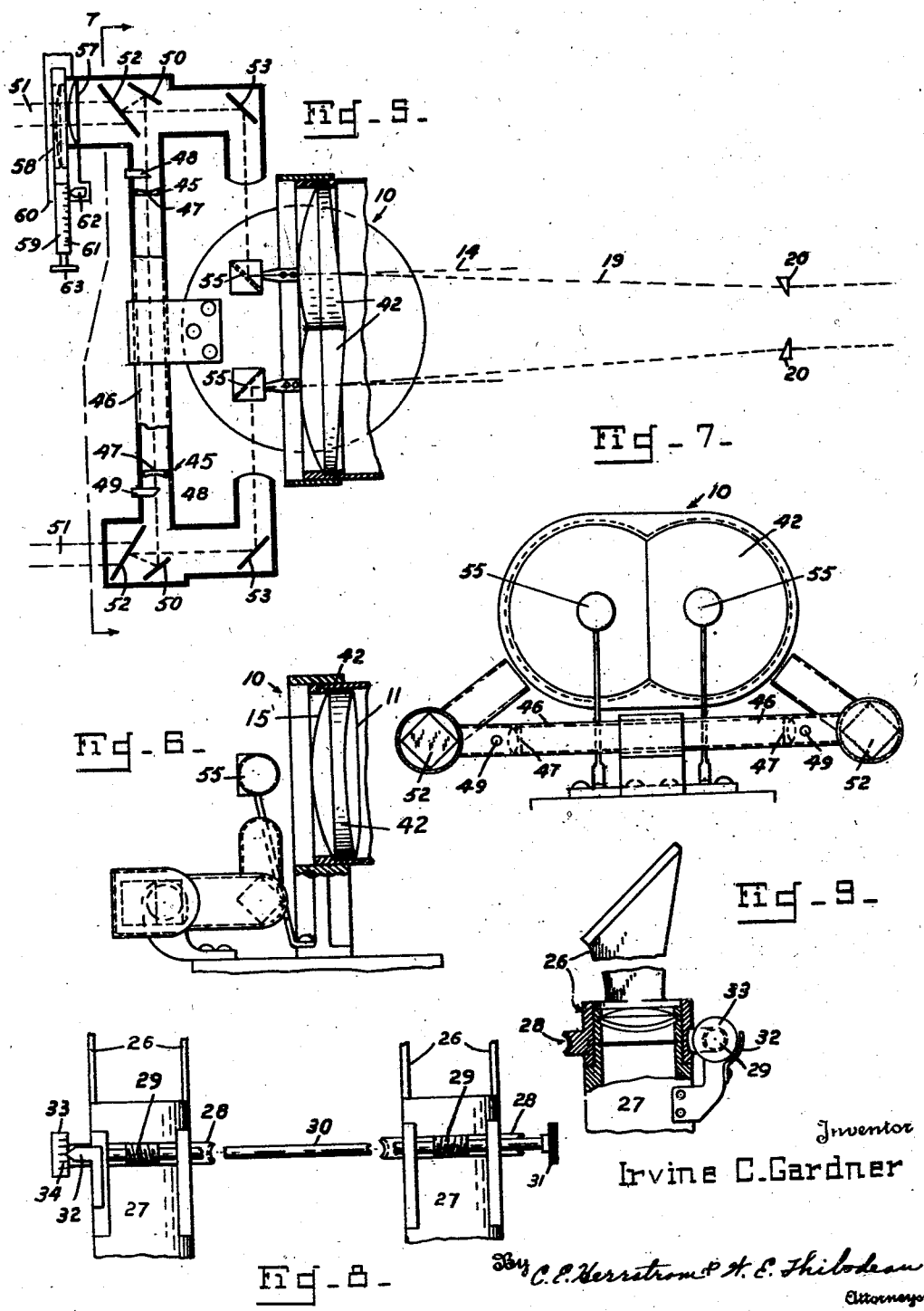

Patented Oct. 14, 1947

2,428,797

UNITED STATES PATENT OFFICE 2,428,797

WIDE ANGLE BINOCULAR TELESCOPE AND RANGE FINDER

Irvine C. Gardner, Chevy Chase, Md.

Application July 13, 1944, Serial No. 544,740

10 Claims. (Cl. 88—2.7)

(Granted under the act of March 3, 1883, as amended April 30, 1928; 370 O. G. 757)

The invention described herein may be manufactured and used by or for the Government for governmental purposes without the payment to me of any royalty thereon.

The invention relates to means for providing the advantages of a binocular telescopic range finding and measuring mechanism and an open sight combined; and in addition affording an extremely wide field in the telescopic system while still availing of reasonable magnification for the ranges to which the embodying instrument is practicably applicable.

Features of this invention will also be understood from my copending application Serial No. 544,739 of even date for "Observation instrument."

It is an aim to enable the use of extremely large objectives to obtain the wide field, yet avoid the expense and large amount of material involved in the conventional manufacture and mounting of telescopic systems, but at the same time obtaining the benefit of a wide base stereoscopic, and reasonably precise measuring mechanism analogous to the more complicated and expensive range finders such as those with internal illuminated stadia reticles and adjuster systems.

It is also an object to provide a system so simple and responsive, as well as inexpensive, that it may be embodied as a unit to be mounted on the gun and readily operated by the gunner or one of the on-carriage crew, at the same time that the elevation and traverse of the piece are effected.

An important consideration in the conception of the invention is the need for an effective instrument of the nature indicated which at the same time will afford greater freedom of movement of the head of the observer when the latter is a gunner required to manipulate various controls in the laying and firing of the piece.

The invention utilizes some features presented in my mentioned copending application for an observation instrument, to which reference may be made for the presentation of my laterally movable eye-piece system, and the manner and materials of production as well as structure of my objective lenses hereinafter referred to.

Additional objects, advantages and features of invention reside in the construction, arrangement and combination of parts involved in the embodiment of the invention, as will appear or be understood from the following description and accompanying drawings, wherein:

Fig. 1 is a top plan schematic view of a system embodying the invention;

Fig. 2 is a side elevation of the system;

Fig. 3 is a fragmentary front elevation of the objective unit;

Fig. 4 is a view similar to Fig. 1 of a modification of the system;

Fig. 5 is a similar view of a further modification;

Fig. 6 is a view from the left of Fig. 5;

Fig. 7 is a view on the line 7—7 of Fig. 5;

Figs. 8 and 9 are details of the revoluble mounting and correction means of the reticle system of Fig. 1;

Fig. 10 is a representation of the field observed through the eye lenses of Figs. 1 or 5, at one position.

Referring more particularly to the drawings, there is shown in Fig. 1 a system which it is contemplated will embody the same elements and features involved in Figs. 1 to 5, and Figs. 8 to 11 of my said copending application as well as Figs. 12 and 13 therein. It is contemplated to form the objectives 10 quite large, though of low magnification, and while the length of focus may be much shorter than indicated in the instant example, and a tube mounting may be provided for objective and eye-pieces if desired, it is specifically an aim in the present embodiment to use a very long focus, and to have the eye-pieces structurally and mechanically disconnected from the objective and separately mounted and movable. In this instance the eye-pieces 20 are carried in a spectacle frame 8 with templets 7 so that they may be worn like ordinary spectacles, as in said copending case.

In the system, plano-convex objectives 10, which may be moulded lenses of glass or transparent plastic of, say, eight inches diameter, are formed with the plane surfaces 11 at an angle to the conventional planes 12 of the lens, and they may be truncated at 13 at their thicker sides in a vertical plane parallel to the focal axes 14 of the convex spherical faces 15. The thick edges at the truncation may be butted or joined and the lenses mounted in this relation on a suitable support 16, which is preferably movable for horizontal sweep but may be fixed. For sweep movement the mount may be on a part of a gun mount or its carriage so that traverse of the gun will sweep the objectives likewise.

The mount 16 may include rearwardly extending arms 16—a on which the eye lenses may be mounted or rested fixedly or removably in any approved construction.

The angular relation of the plane faces 11 of the lenses to the focal axes of the spherical parts introduces a prismatic wedge value into the lenses by which the incident bundles 17 of parallel rays refracted by the lenses are deflected and focussed in cones 18 having convergent axes 19. The eye lenses 20 are preferably of negative focus so that each, in coordination with a respective objective will constitute a Galilean telescope system. In addition, each lens is constructed with a prismatic wedve value the opposite of that in the objectives, so that the pencils 22 transmitted from the objectives to the eye lenses will be refracted on parallel axes 22' to the pupils of the observer.

With this arrangement of objective and eye lens the pencil 22 subtended by the eye lens is only a small part of the whole cone 18 of refracted rays from the objective, and the wearer of the eye lenses may swing his head so that the line of sight will sweep across the objective (the observer's neck being the center of the movement) and thus have advantage of a field of view several times the width of the field of the conventional telescopic system of the same focal length. Other movements for wider scanning of the field will be understood and are described in said copending case. Stereoscopic vision is maintained throughout a substantial movement of this kind, since the divergent axes of the eye lenses will be within respective cones from both objectives throughout such movement. This manner of use may involve some sacrifice of resolution at extreme laterally translated positions of the eye pieces outside the cone 18, with respect to the axis of the objectives, but enables initial location of targets, which may then be inspected with good definition as before explained. While the pencil incident on the eye lens 20 and focused on the eye by this lens may be changed by slightly shifting the latter lens translatively before the eye, this is not readily practicable or intended, and the pencils which are effectively focused or resolved by the lenses 20 are such as those subtended by the lenses 20 in any of a reasonable range of positions of the lenses 20 as a unit while fixed coaxially with and before the eyes of the user; central pencils of this kind are indicated at 22 and 43, but may vary in position according to the position of the eye lenses relative to the axes of the objectives.

Coordinated with the objectives there are respective direct reflex sight units 23, which may be duplicates of a sight now largely used, an example of which is shown in Patent No. 1,610,532 to Russell. The reticle, illumination and collimating system may be conventional, and, being well understood, will not be described in detail except where specific departure in structural features is made. The reflector 24 in each is mounted in front of and across the axis 14 of a respective objective and covers only a small part of the area of the objective. The reflector reflects the rays from the reticle along the objective axis and concentric thereto. The reticle rays thus become a part of the bundle of incident rays representing the field of the objective and will appear to be suspended in space far or near, according to the apparent lateral relative spacing of the reticles. In the prior reflex sight the axis of the reflected reticle rays is fixed relative to the base mount or gun on which the sight is installed, but in the present instance means is provided to vary the actual spacing or the apparent spacing of the reticle images, and to measure the movement necessary to change or effect their coincidence so that they may appear as one fused figure at infinity in one relation, and may be changed to another fused relation so as to appear to be at some finite distance. When the incident axial rays of the reflectors are parallel the reticle images 64 (Figs. 2 and 10) will fuse in the vision of an observer gazing at an infinite distance. When an object at some intermediate distance is observed in the field of the objectives and the gaze of the observer is directed and focussed thereon, the two reticle images will appear as separate figures, but may be made to merge by either moving the units 23 translatively closer together or by deflecting the axial rays reflected from the reflectors 24 through a limited distance so that they converge. If such convergence is not too great, the two reticle images will continue to merge and will appear at some finite distance. When the observer has focussed his gaze on the combined target image, if the fused reticle image is seen at the same time, a condition is attained corresponding to "stereoscopic contact" as understood in the use of range finders; and if a measure of the movement from the first relation to the second is obtainable, this may be translated into terms of range. As a means for converging and diverging the reflected reticle axes, I have shown in Figs. 1, 2, 3, 8, and 9 a construction in which the bases of the units 23 are conventional and are mounted with any convenient support. The upper part of each, however, includes a reflector mount 26 revoluble around the lower barrel 27 carrying the collimator lens or system and a worm gear 28 is fixed on the mount 26, a driving worm 29 being engaged therewith. There are two worms 29 of opposite pitch, engaged with the respective gears 28 and fixed on a common shaft 30 suitably mounted and operated. The shaft is indicated in the present instance as having an operating knob 31. The stationary part of the reflex sight elements may have a pointer 32 thereon and a rotating dial 33 on the shaft may have a scale 34 (Fig. 8) thereon adjacent the pointer, which may be calibrated in yards range. In use, the entire telemeter is directed until the fused stereoscopic image of the reticle pattern appears superposed upon the target. Both are viewed stereoscopically, and, within the ability of the eye to perceive stereoscopic parallax, one can judge which appears nearer, the reticle image or the target. It will now be possible by operating the knob 31 to cause the reticle image to seem to approach or recede from the observer until it appears in coincidence with the target. The range corresponding to each angular position of the mount 26 is thus indicated on the dial 33 by the pointer 32. However, this is a relatively simple instrument of necessarily low precision because the base length is small (in Figs. 1 to 3 the base length being the distance between the centers of the two objectives), and the magnification is low. Consequently, it is assumed that it will be used with guns of moderate range. It might, in this device, for example, be advantageous to abandon the idea of setting the reticle to coincide stereoscopically with the target at any distance, but rather set the reflector sight permanently to appear stereoscopically fused at the maximum range at which fire should be opened. This would eliminate the need of the operating gearing. The entire apparatus would then be used as a monocular reflector sight as now used, except that the reticle appears in stereoscopic relief and much ammunition will be saved because the gunner will have a standard range indicated with the target, which will prevent him from opening fire upon an approaching target until it has come within the distance of effective fire. This has other advantages, tactical and otherwise.

The stereoscopic field image 36 observed in the eye lenses at one position relative to the objectives will appear substantially as illustrated in Fig. 10, the less bright lateral or wing portions 35 being ignored except when outer areas of the field of the objective are to be inspected, and the central field 36 being the stereoscopic image utilized solely for range determination.

In Fig. 4 I have shown a manner of establishing a broad base line in the instrument for perfecting the range determination, yet preserving the direct sight function referred to in connection with Figs. 1 and 2. In this case small bundles 37 of rays parallel to the axes of the lenses 10 are received by window reflectors 38 at widely separated points equidistant outwardly of respective sides of the objective group of bundles 39 (the latter being the same as the bundles 17 of Fig. 1) of incident coaxial rays, and are totally reflected to total reflectors 40 mounted before and on the symmetrical axes 14 of the respective objectives 42 and including a major part of, or only that area of the total field of the objectives which is the origin of the pencil 43 refracted and transmitted to the eye lenses 20 when the latter are on the axes of the whole cones 44 of refracted field rays and focussed therewith. The cones 44 are the same as the cones 18 of Fig. 1.

The reflex elements before described are also used if desired, and would be interposed between the reflectors 40 and the objectives 42 in the same manner as before described.

Further referring to Fig. 4, with the broad base reflectors a field may be viewed with the eye lenses which will not be materially different from the field of the objectives 10 as in Figs. 1 and 2 without the broad base elements, and an object may be located in the outer parts of the fields of the objectives by moving the eye-pieces within or outside the cones 44 derived from the whole bundles 37 and 39 of incident rays parallel to the principal axes of the spherical elements of the objectives. The stereoscopic range-determining value of the images when so seen will be reduced, however, and this use is intended only as a simple survey function. When so located however, and if the object appears to be approaching the effective area where indication of range will be desired, the objective unit is swung so that the object is brought within the bundles 37 incident on the wide base reflectors 38, and then a very noticeable range value may be derived from the stereoscopic inspection. In connection with the adjustment by such means as in Figs. 1, 2, 8 and 9 of the reticles to stereoscopic contact with the object image, a more definite reading of range may be obtained.

The device is adaptable to use with the refracting wedges and internal adjustment systems familiar on range finders heretofore, and other forms. A simplification of the internal reticle system, based on those used in height and range finders, by which the object images are adjusted in contact with a fused reticle symbol, and an adjuster system much simplified, are shown in Figs. 5 to 7. In this instance objectives 42 (the same as those numbered 10) and eye lenses 20 are utilized in accordance with the preceding disclosures, and are similarly designated. A pair of reticle system objectives 45 are mounted in a transverse tube 46 below the level of the main objectives 42 each having a reticle mark 47 at its inner nodal point, and outwardly of these objectives are respective illumination prisms 48 arranged to reflect light from sources 49 axially through the internal objectives 45. The reticle images projected through each end of this tube system are reflected by total reflectors 50 located laterally beyond the axes of the incident wide base bundles 51 to transparent reflectors 52 across the last named axes by which the images are deflected along the axes of the respective bundles 51 which are incident on window reflectors 53 at the same level as the tube 46 and set at angles of forty five degrees to the incident bundle axes but arranged to reflect the axial rays inward in a transverse vertical plane and upward in such plane to a level with the axes 14 of the respective objectives 42 where they are intercepted by total reflectors 55 and deflected along the objective axes 14 as in the case of the reflectors 40 of Fig. 4.

A fused reticle image may thus be formed in the eye lenses, in the way familiar in other similar reticle systems.

Adjustment of the stereoscopic image of the object for range is secured by means of a positive lens 57 fixed symmetrically across the axis of the bundle 51 forwardly of the reticle reflectors 50—52 and before this fixed lens a transversely elongated negative lens 58 is mounted in a transversely sliding mount 59 set on a transverse horizontal guideway 60, fixed with respect to the objectives and reflector system. On this slide 59 there is provided a scale 61 and on the guideway 60 a coordinated pointer 62 is provided. The lens 58 may be shifted with its mount along the guideway by any conventional means, but a knob 63 is indicated as a formal showing of means. With the lenses 57 and 58 symmetrically opposed, the bundle 51 remains undeviated, but if lens 58 is displaced in its own plane toward either limit of its sliding movement, a deviation will be introduced approximately proportional to the power of either lens and the linear displacement.

This is a familiar device, well known heretofore and since its details comprise no novel feature of the invention and are well understood they are not illustrated or described more specifically.

The system last described is also most useful when mounted for horizontal sweep and, in use, the observer uses both the whole outer field presented by the large objective lenses, as well as the central part received through the wide base reflectors, to scan the whole terrain under observation, in order to ascertain whether any object is present representing a target, or the course of which must be charted, etc. When an object is discovered requiring range evaluation, the instrument (comprising the objectives, reflectors and range adjusting devices, as well as the reticle system) is rotated until the subject-object or target is brought into the central window area 64 in the observed field (as indicated in Fig. 10) representing the rays transmitted by the side base reflectors. This window may be defined by lines in the reticle or on the objectives or otherwise if not otherwise distinguishable readily.

The stereoscopic images of the reticle and target will now be seen superposed but in general they will appear at different distances. Lens 58 is then translated by a suitable mechanical movement. This deviates the rays proceeding from the target and their translation is continued until the target rays have the same angular parallax as the rays which form the stereoscopic image of the reticle. The target and reticle now appear at the same distance and may be said to be in stereoscopic contact; and the range is read on scale 61 against index 62.

As before indicated the several forms of the invention are each adapted to work of a nature for which the conventional telemeter is not fitted and for which the latter is in fact impracticable. The operator is provided with very large eye freedom, as well as bodily freedom of movement, at the same time attaining a greatly enlarged field in telescopic focus, which is particularly well adapted for finding and observing rapidly moving objects, for which a constant watch must be maintained and whose whereabouts cannot be predicted. A suggested application is to machine guns mounted for anti-aircraft fire, either stationary or mobile. The gun, telemeter, and operator could be mounted to move integrally as in the turret of an airplane, or on a gun mount. The telemeter would serve as sight and telemeter. The eye and body freedom provided is similar to that described in my said copending application, and is sufficient to enable one man to operate the gun and the telemeter at the same time. That is to say, the eye pieces, being mounted like spectacles on the head of the observer, he can move his head and eye pieces out of operative or optically coupled relation to the objectives and return them to observing positions at will. When inspecting a detailed point in the field, the head of the observer or frame 8 may be steadied by resting either against the arm 16a.

During use of the instrument, with the wide base reflector system, included, the central portions of the fields which might be derived from directly incident rays from an object point on the focal axis of the objectives will be entirely extinguished by the innermost reflector immediately before the objectives, and replaced by the reflected rays from that same object point transmitted through the wide base reflector system. The reflected portions of the fields would be usable in the manner described without confusion. The proper space relation of the reflectors to the objectives to attain the functions desired may be readily determined, and have not been definitely illustrated in the drawings, in order to present the elements of the systems within the limited space available. When minute inspection is not being made in the wide base image 64, the eye piece assembly may be laterally of the position shown in Figures 1, 4, or 5, for general observation and search or scanning, and the binocular effect will be preserved throughout such lateral positions within a reasonable range without great sacrifice of clarity.

I have described the invention in the best form as yet perfected by me, but it will be understood that this is purely exemplary, which will serve as sufficient guidance for those versed in fire control construction in applying it to various specific situations where it is of value, and various modifications of construction, arrangement and combination, substitution of materials and equivalents, mechanical or otherwise, may be made without departing from the spirit of the invention set forth in the appended claims, wherein:

I claim:

1. An instrument of the character described comprising two telescopic objectives and coordinated separately laterally movable eye lenses, the objectives being of a diameter which is a multiple of that necessary to include conventional fields for the eye lenses, means being included to direct the refracted rays from the objectives on axes coincident with respective eye lens centers at their normal focussed distance from the objectives, a reflector system constructed and arranged to reflect parts of the total fields of the objectives along the axes of the objectives, the reflector system having window reflectors below and much more widely spaced than the objectives, and of cross sectional dimension corresponding to that of the source of one of the pencils subtended by the eye lenses, a dual reticle system comprising a lens system arranged on a horizontal axis transverse to and below the level of the objectives, two reticles on said axis, means to illuminate the same, and means to project images of the reticles on said transverse axis and respectively along the axes of said reflected parts of the field.

2. An instrument of the character described comprising two telescopic objectives and coordinated eye lenses, the objectives being of a diameter which is a multiple of that necessary to include conventional fields for the eye lenses said eye lenses being translatively movable laterally as a unit, means being included to direct the refracted rays from the objectives on axes having interpupillary spacing at the normal focussed position of the eye lenses, a reflector system including window reflectors much more widely spaced than said objectives and arranged to reflect rays from a central object point on the focal axes of said objectives inwardly before the latter and along said axes, said reflector system subtending only the rays constituting the origins of small pencils of refracted rays immediately adjacent the axes of the refracted rays from the objectives.

3. The structure of claim 2 in which said reflector system subtends only the rays constituting the origins of the pencils subtended by the eye lenses when located symmetrically on the said axes in focussed relation of the objectives.

4. A binocular telescopic system of the character described comprising two objectives spaced laterally substantially more than the normal interpupillary distance, and two oculars respectively and operatively associated therewith, each objective having structural components of wedge prism value whereby the axes of the refracted fields are converged to interpupillary spacing at the distance of normal focal coordination with the oculars, said oculars independently mounted at inner ocular spacing, each having refracting components of wedge prism value opposite in direction to said components of the objectives, each ocular constructed and arranged to intercept and focus respective portions only of the objective fields, said objectives having a diameter which is a multiple of the bases of the pencils intercepted by said oculars.

5. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, open-sight transparent reflectors interposed across the principal axes of said objectives, and means to project stadia images against said reflectors to be reflected along the principal axes of the instrument.

6. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, open-sight transparent reflectors interposed across the principal axes of said objectives, and means to project stadia images against the reflectors to be reflected respectively along the principal axes of the instrument, said reflectors conforming closely in size to the base cross section of the pencils of rays subtended by the eye lenses.

7. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, open-sight transparent reflectors interposed across the principal axes of the objectives, means to project stadia images against said reflectors to be reflected along the principal axes of the instrument, and means for reflecting to said objectives bundles of rays from fields much more widely spaced than the axes of said objectives, said bundles being of diameters which are approximately the same as those of the bases of said pencils.

8. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, movable refracting means subtending only the ray origins of one of said pencils in at least one of said objectives, constructed and movable in position at will to vary the apparent relative positions of the said origins in opposite directions alternatively, and means to indicate the degree of relative deflection of the rays.

9. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, movable refracting means subtending only the ray origins of one of said pencils in at least one of said objectives, constructed and movable at will to deflect the same relatively to the objective field in either of opposite directions, means to indicate the degree of relative deflection of the rays, and means to project on the axes of said objectives one or more illuminated stadia images within said ray origins of said pencils, whereby a target may be located in the field of the objectives without said deflected rays and its range determined when included in the deflected rays.

10. A binocular instrument of the character described comprising a matched pair of objectives of large diameter, and eye lenses focally coordinated therewith and mounted for lateral translative movement as a unit relative to the principal axes of the objectives, the objectives being of a diameter which is a multiple of the diameter of the bases of the pencils subtended and effectively resolved by each of the eye lenses when normally focused therewith, a frame having said eye lenses mounted thereon, and means to mount the frame on the head of an observer.

IRVINE C. GARDNER.

REFERENCES CITED

The following references are of record in the file of this patent:

UNITED STATES PATENTS

| Number | Name | Date |
|---|---|---|
| 1,724,093 | Kauch et al. | Aug. 13, 1929 |
| 934,916 | Von Hofe | Sept. 21, 1909 |
| 1,497,294 | Erfle | June 10, 1924 |
| 1,549,579 | Lenouvel | Aug. 11, 1925 |
| 1,339,386 | Ham | May 11, 1920 |
| 1,561,858 | Jacob | Nov. 17, 1925 |
| 2,262,100 | French | Nov. 11, 1941 |

FOREIGN PATENTS

| Number | Country | Date |
|---|---|---|
| 9,328 | Great Britain | 1909 |